United States Patent Office 2,805,135
Patented Sept. 3, 1957

---

2,805,135

STABILIZED HYDROCARBON FUEL OIL COMPOSITIONS AND STABILIZERS THEREFOR

Alan Bell and Gerald R. Lappin, Kingsport, Tenn., assignors to Eastman Kodak Company, Rochester, N. Y., a corporation of New Jersey No Drawing. Application August 25, 1954,
Serial No. 452,214

8 Claims. (Cl. 44—66)

This invention relates to the stabilization of hydrocarbon fuel oils against objectionable sludge formation and to improved fuel oil additives of increased effectiveness as sludge inhibitors.

Fuel oils such as the various grades of furnace oils and Diesel oils, and particularly those obtained by thermal or catalytic cracking processes, are very susceptible to the formation of a precipitate of polymeric material commonly called sludge. The formation of sludge is highly objectionable since it plugs oil lines, burner jets, pumps and filter screens. A number of materials have been proposed for use in stabilizing fuel oils against objectionable sludge formation, but, heretofore, such additives have tended to promote the formation of either oil-in-water or water-in-oil emulsions. The emulsions thus formed, particularly the oil-in-water emulsions, were quite stable and were considered to be deleterious from the standpoint of storage and use of the oils. Among the most effective antisludging additives known heretofore were the diamides prepared by reacting a polyalkylene polyamine with a fatty acid, such as are disclosed in White et al., U. S. Patent 2,622,018. These amide-type additives were of utility in obviating sludge formation but did promote the formation of emulsions. Prior to this invention, the known amide-type sludge dispersants were solids, semisolid pastes or viscous liquids of poor solubility in fuel oil. This physical character limited the concentration which could be used and also tended to cause precipitation of the additive at low temperatures. Although the sludge dispersants employed prior to this invention were effective, it is desirable to provide materials having even higher stabilizing activity.

It is accordingly an object of this invention to provide new and improved materials for stabilizing hydrocarbon fuel oils against objectionable sludge formation for longer periods and under more stringent conditions than was possible with the additives known heretofore.

It is also an object of this invention to provide fuel oil additives which not only have high activity in preventing sludge formation but which do not promote the formation of either oil-in-water or water-in-oil emulsions in any degree.

Another object of the invention is to provide improved sludge dispersants which are relatively fluid liquids miscible in all proportions with fuel oils, even at low temperatures.

Another object of the invention is to provide new fuel oil additives which not only have exceptionally high activity as sludge dispersants and inhibitors but which, in addition, exhibit an unusual effectiveness as corrosion inhibitors for metals which are in contact with the inhibited oil and water.

Another object of the invention is to provide fuel oil compositions having a high degree of stability against sludge formation even though such compositions contain a substantial amount of furnace oils or Diesel oils obtained by thermal or catalytic cracking processes, and which would normally be highly susceptible to sludge formation.

Other objects will be apparent from the description and claims which follow.

These and other objects are attained by means of this invention wherein hydrocarbon fuel oils are stabilized by means of new and improved additives which are produced by reacting oleic acid with a diamine of the formula

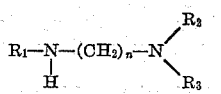

wherein $R_1$ and $R_2$ are either hydrogen or alkyl groups of 1–4 carbon atoms, $R_3$ is an alkyl group of 1–4 carbon atoms and $n$ is a whole integer in the range of 2–8. Depending upon the proportions of the reactants, the improved additives embodying this invention will be either N-alkylated monoamides of the formula

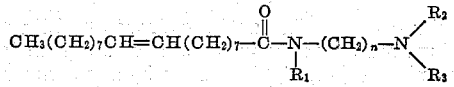

or N-alkylated diamides of the formula

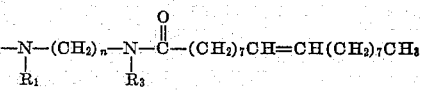

wherein $R_1$, $R_2$, and $R_3$ and $n$ have the values set out above. The additives embodying this invention are highly effective for stabilizing any of the hydrocarbon fuel oils which are normally susceptible to sludge formation when employed in amounts of 0.001 to 0.10% by weight of additive based on the weight of the oil being stabilized. In most cases, the additive is preferably employed in a concentration of 0.005 to 0.05% by weight. Higher amounts can be used, although they are not necessary for most applications.

The additives embodying this invention as defined hereinabove possess a higher degree of activity as sludge dispersants and inhibitors than any of the additives known heretofore, including the various amide-type additives. Unlike most fuel oil additives, the materials embodying this invention do not in any degree promote the formation of either oil-in-water or water-in-oil emulsions. In addition the additives embodying this invention are relatively mobile liquids which are miscible in all proportions with fuel oils, even at low temperatures. In addition to these advantages, the additives embodying the invention also possess the unexpected property of being highly effective as corrosion inhibitors for metals which come in contact with the inhibited oil and water such as commonly occurs in storage and use.

The additives embodying the invention are readily prepared by reacting a diamine of the formula

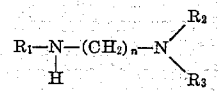

with oleic acid. Other fatty acids such as caprylic acid, capric acid, lauric acid, myristic acid, palmitic acid, stearic acid, linoleic acid, linolenic acid, and the like form similar amide derivatives which are useful but which are less effective than oleic acid. Consequently, the oleic acid derivatives are preferably prepared by using either relatively pure oleic acid or a mixture of fatty acids consisting largely of oleic acid. When, in the diamine, $R_2$ and $R_3$ are both alkyl groups, only one equivalent of the oleic acid will react with the diamine to give a monoamide. If, in the diamine, R₂ is hydrogen, either one or two equivalents of oleic acid can be caused to react with the diamine to give either monoamides or diamides as defined hereinabove. Although both the monoamides and diamides as defined herein are highly effective dispersants for sludge in fuel oil, the monoamides are more effective than the diamides and hence are preferred. The new additives are readily prepared by heating a suitable N-alkylated diamine with an appropriate amount of oleic acid at 150–200 C. until the reaction is complete. The reaction usually requires from 1 to 4 hours. If desired, entraining solvents such as xylene or Stoddard solvent can be used to facilitate the removal of the water formed during the reaction. Alternatively, the reaction can be carried out under vacuum to aid in the removal of the water, or a stream of an inert gas such as nitrogen, can be passed through or over the reaction mixture to remove water vapor and protect the reaction mixture from oxidation.

The N-alkylated diamines which can be used in preparing the additives embodying the invention can be any of the materials of the formula

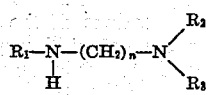

Thus, for example, R₁ can be hydrogen and R₂ and R₃ can be methyl groups as in the case of 3-dimethylaminopropylamine. Similarly, R₁ can be hydrogen and R₂ and R₃ can be ethyl groups or other alkyl groups containing 1–4 carbon atoms, as in the case of 3-diethylaminopropylamine or 3-isopropylaminopropylamine. If desired, each amino group can contain an alkyl substituent such as in N,N'-dimethylethylenediamine or N,N'-diisopropylethylenediamine, or N,N'-dimethyl-1,3-propylenediamine, or N,N'-diisopropyl-1,3-propylenediamine, or similar compounds as defined. The other diamines which are suitable are obvious from the formula set out above, and such materials will not be set out in detail herein, since it will be understood that any of such materials are suitable for use in practicing the invention. Any of these diamines can be reacted with oleic acid to form the corresponding N-oleoyl or N,N'-dioleoyl derivatives as described.

Unexpectedly, the N-alkyl derivatives as defined herein were much more effective as sludge dispersants than were the corresponding diamides of polyalkylene polyamines or the simple N-alkyl amides. The reason why the materials of this invention do not promote emulsion formation, in contrast to the usual fuel oil additives, is not known, and their superiority in this important property was wholly unexpected.

The preparation of typical additives embodying this invention is illustrated by the following examples:

*Example 1*

A typical N-alkyl monoamide, which can be named either as N-(3-dimethylaminopropyl)oleamide or N-oleoyl-N'N'-dimethyl-1,3-propylenediamine, was prepared by heating a mixture of 282 parts by weight of oleic acid and 102 parts by weight of 3-dimethylaminopropylamine at 165–195° C. for 90 minutes. During this time, 18 parts by weight of water was evolved. The product, after cooling, was a free-flowing light amber liquid. The effectiveness of this material and others embodying the invention as a sludge dispersant is shown in Table 1.

*Example 2*

As described, an entraining solvent can be employed for facilitating the removal of water formed during the reaction. Thus, a solution of 71 g. of oleic acid and 26 g. of 3-dimethylaminopropylamine in 100 ml. of xylene was refluxed with stirring into a Dean-Stark water trap. The xylene was distilled off until the temperature reached 160 C., whereupon evolution of water began and was completed after 90 minutes. The excess xylene was then removed by distillation until the pot temperature rose to about 180° C. The product, consisting of N-(3-dimethylaminopropyl)oleamide, contained 17% by weight of xylene and was a fluid, light amber liquid.

*Example 3*

The preparation of N-alkyl diamides can be carried out in similar fashion. Thus, a mixture of 28 parts by weight of oleic acid and 5.8 parts by weight of 3-isopropylaminopropylamine was heated at 160–200° C. for 3 hours. After cooling, the product, N,N'-dioleoyl-N-isopropyl-1,3-propylenediamine, was a fluid, dark amber liquid.

The other additives defined herein are readily prepared in similar fashion.

The utility of typical additives embodying the invention in stabilizing fuel oils against objectionable sludge formation is illustrated by the test results set out in Table 1. The test method commonly employed is a modification of the Cities Service Method described in Anal. Chem. 24, 1959 (1952). In the modification employed, the test consists of heating a sample of oil at 210° F. while passing a stream of air through the oil, thereafter cooling the oil sample and filtering it through a filter paper. The amount of sludge collected was then evaluated visually. The filter paper, after filtering a sample of oxidized uninhibited oil, was black and assigned a value of 10, whereas an effective inhibitor gives a filter paper color ranging from white to light gray. A value of 0 is assigned when there is no visible sludge. In the usual fuel oil test, the heating is continued for only 6 hours. In contrast to this, fuel oils stabilized with the additives embodying this invention were subjected to the accelerated test for 72 hours before filtering and evaluation. The results thereby obtained are set out in Table 1 using typical No. 2 grade fuel oil.

TABLE 1

| Additive | Conc., lb./1,000 bbls. | Time, Hours | Filter Pad Color |
| --- | --- | --- | --- |
| Control | | 72 | 10.0 |
| N-(3-dimethylaminopropyl)oleamide | 25.0 | 72 | 3.0 |
| N-(3-dimethylaminopropyl)oleamide | 25.0 | 72 | 3.0 |
| N-oleoyl-N'-isopropyl-1,3-propylene-diamine | 25.0 | 72 | 3.0 |
| N,N'-dioleoyl-N-isopropyl,3-propylenediamine | 25.0 | 72 | 3.0 |
| Control | | 72 | 8.0 |
| N-(3-diethylaminopropyl)oleamide | 25.0 | 72 | 1.5 |
| N,N'-dioleoyl-N-isopropyl-1,3-propylenediamine | 25.0 | 72 | 2.0 |

Similar results are obtained with other additives embodying the invention as defined herein. The additives of this invention can be employed alone, or they can be combined with other additives such as antioxidants, metal deactivators, combustion promoters, and the like, in accordance with usual practice.

Thus by means of this invention a greatly improved class of sludge inhibitors for hydrocarbon fuel oils is provided. The materials not only are effective sludge dispersants but also have the unexpected property of not promoting the formation of emulsions of either the oil-in-water or water-in-oil type to any degree, as well as the properties of being miscible with fuel oils in all proportions and over a wide temperature range, and of acting as corrosion inhibitors for metals coming in contact with the inhibited oil. Because of their high activity, the additives embodying this invention can be successfully used in relatively lower concentrations than is possible with less active sludge dispersants. The additives are readily prepared by simple and straightforward processes which can be carried out either batchwise or continuously, as desired. Since the additives are normally liquid, they can be added directly to fuel oils without the use of an auxiliary solvent, and without necessitating special treatment to ensure solution in the oil being treated. The stabilized oils which are prepared in accordance with this invention include any of the hydrocarbon fuel oils which are normally susceptible to sludge formation. Thus, the invention is particularly applicable, but is not limited, to the stabilization of furnace oils and Diesel oils containing a substantial percentage of thermal or catalytically cracked stocks.

Although the invention has been described in considerable detail with particular reference to certain preferred embodiments thereof, variations and modifications can be effected within the spirit and scope of the invention as described hereinabove and as defined in the appended claims.

We claim:

1. A hydrocarbon fuel oil containing 0.001 to 0.10% by weight of an additive comprising an N-alkylated amide of oleic acid selected from the group consisting of monoamides of the formula

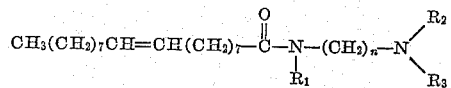

and diamides of the formula

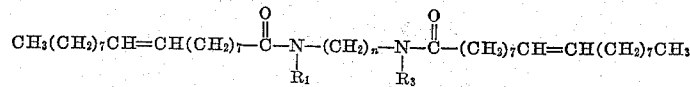

wherein $R_1$ and $R_2$ are members of the group consisting of hydrogen an alkyl groups of 1–4 carbon atoms, $R_3$ is an alkyl group of 1–4 carbon atoms, and $n$ is a whole integer in the range of 2–8.

2. A hydrocarbon fuel oil containing 0.001 to 0.10% by weight of an additive comprising an N-oleoyl-N'-alkyl-α,ω-alkylene diamine in which the alkyl group contains 1–4 carbon atoms and the alkylene group contains 2–8 carbon atoms.

3. A hydrocarbon fuel oil containing 0.001 to 0.10% by weight of an additive comprising an N-oleoyl-N',N'-dialkyl-α,ω-alkylene diamine in which the alkyl groups contain 1–4 carbon atoms and the alkylene group contains 2–8 carbon atoms.

4. A hydrocarbon fuel oil containing 0.001 to 0.10% by weight of an additive comprising an N,N'-dioleoyl-N'-alkyl-α,ω-alkylene diamine in which the alkyl group contains 1–4 carbon atoms and the alkylene group contains 2–8 carbon atoms.

5. A hydrocarbon fuel oil containing from 0.005 to 0.05% by weight of N-oleoyl-N',N'-dimethyl-1,3-propylene diamine.

6. A hydrocarbon fuel oil containing from 0.005 to 0.05% by weight of N-oleoyl-N',N'-diethyl-1,3-propylene diamine.

7. A hydrocarbon fuel oil containing from 0.005 to 0.05% by weight of N-oleoyl-N'-isopropyl-1,3-propylene diamine.

8. A hydrocarbon fuel oil containing from 0.005 to 0.05% by weight of N,N'-dioleoyl-N-isopropyl-1,3-propylene diamine.

References Cited in the file of this patent
UNITED STATES PATENTS

| | | |
|---|---|---|
| 2,139,679 | Hardy | Dec. 13, 1938 |
| 2,345,632 | Robinson | Apr. 4, 1944 |
| 2,369,490 | Proell | Feb. 13, 1945 |
| 2,622,018 | White | Dec. 16, 1952 |